US007890380B2

(12) United States Patent
Stefanik et al.

(10) Patent No.: US 7,890,380 B2
(45) Date of Patent: Feb. 15, 2011

(54) METHOD, SYSTEM, AND COMPUTER READABLE MEDIUM FOR IMPLEMENTING SALES OF PRODUCTS USING A TRACE OF AN OBJECT

(75) Inventors: John Stefanik, Alpharetta, GA (US); Phillip Weeks, Atlanta, GA (US); Charles P. Bradley, Lawrenceville, GA (US); E-Lee Chang, Mableton, GA (US); Tuck Seng Tan, Lawrenceville, GA (US); Lawrence K. Tucker, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 953 days.

(21) Appl. No.: 11/745,151

(22) Filed: May 7, 2007

(65) Prior Publication Data

US 2008/0281684 A1    Nov. 13, 2008

(51) Int. Cl.
*G06Q 30/00* (2006.01)
*G06F 17/30* (2006.01)
(52) U.S. Cl. ............................ 705/26; 705/27; 725/37; 725/60; 725/61
(58) Field of Classification Search ............. 705/26–27; 725/37–61
See application file for complete search history.

(56) References Cited

U.S. PATENT DOCUMENTS

| | | | |
|---|---|---|---|
| 5,818,438 A | 10/1998 | Howe et al. | |
| 5,892,508 A | 4/1999 | Howe et al. | |
| 6,282,713 B1* | 8/2001 | Kitsukawa et al. | 725/36 |
| 6,502,242 B1 | 12/2002 | Howe et al. | |
| 6,567,982 B1 | 5/2003 | Howe et al. | |
| 6,615,408 B1* | 9/2003 | Kaiser et al. | 725/112 |
| 7,428,504 B2* | 9/2008 | Song | 705/26 |
| 2002/0016965 A1* | 2/2002 | Tomsen | 725/42 |
| 2002/0188526 A1* | 12/2002 | Muneishi et al. | 705/26 |
| 2002/0194604 A1* | 12/2002 | Sanchez et al. | 725/60 |
| 2003/0056219 A1* | 3/2003 | Reichardt et al. | 725/60 |
| 2004/0111332 A1* | 6/2004 | Baar et al. | 705/26 |
| 2007/0006267 A1* | 1/2007 | Walker et al. | 725/60 |

OTHER PUBLICATIONS

"Company to sell products worn on cable shows". Gary Gentile. Connecticut Post. Bridgeport, Conn.: May 4, 2007.*

* cited by examiner

*Primary Examiner*—William Allen
(74) *Attorney, Agent, or Firm*—Cantor Colburn LLP

(57) ABSTRACT

A method, system, and computer program product for implementing sales of products featured in a program is provided. The method includes associating an object featured in the program with the program and a product. The product corresponds to the object in the program. The method includes receiving a request relating to the object featured in the program and presenting product information associated with the product corresponding to the object in response to the request relating to the object. The method further includes generating an order for the product in response to a request to purchase the product.

11 Claims, 4 Drawing Sheets

METHOD, SYSTEM, AND COMPUTER READABLE MEDIUM FOR IMPLEMENTING SALES OF PRODUCTS USING A TRACE OF AN OBJECT

BACKGROUND

The present invention relates generally to electronic commerce, and more particularly, to methods, systems, and computer program products for implementing product placement and sales of products featured in a program.

Advertisers have increased their use of product placement directly in movies, television shows, music videos, etc., as compared to traditional advertisements that occur during programming breaks. This practice is likely to continue given the current trends with respect to current marketing channels. For example, as more consumers rely upon personal video recording (PVR) devices that filter out advertisements, as well as decreased television viewing in light of competing interests, traditional marketing methods, such as television commercials are becoming less effective in achieving sales objectives. However, utilizing these techniques for product placement within a programming environment may not be sufficient in influencing product sales with respect to a viewing audience. For example, viewers who recall seeing a product during a television program may not know how or where to purchase the product. Thus, there may be viewers who are interested in acquiring a product seen during a program that are unable to find it.

What is needed, therefore, is a way to utilize product placement in programming that provides the ability to acquire information about a desired product, thereby increasing potential sales and revenue for advertisers.

BRIEF SUMMARY

Exemplary embodiments include a method, system, and computer program product for implementing product placement and sales of products featured in a program. The method includes associating an object featured in the program with the program and a product. The product corresponds to the object in the program. The method includes receiving a request relating to the object featured in the program and presenting product information associated with the product corresponding to the object in response to the request relating to the object. The method further includes generating an order for the product in response to a request to purchase the product.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
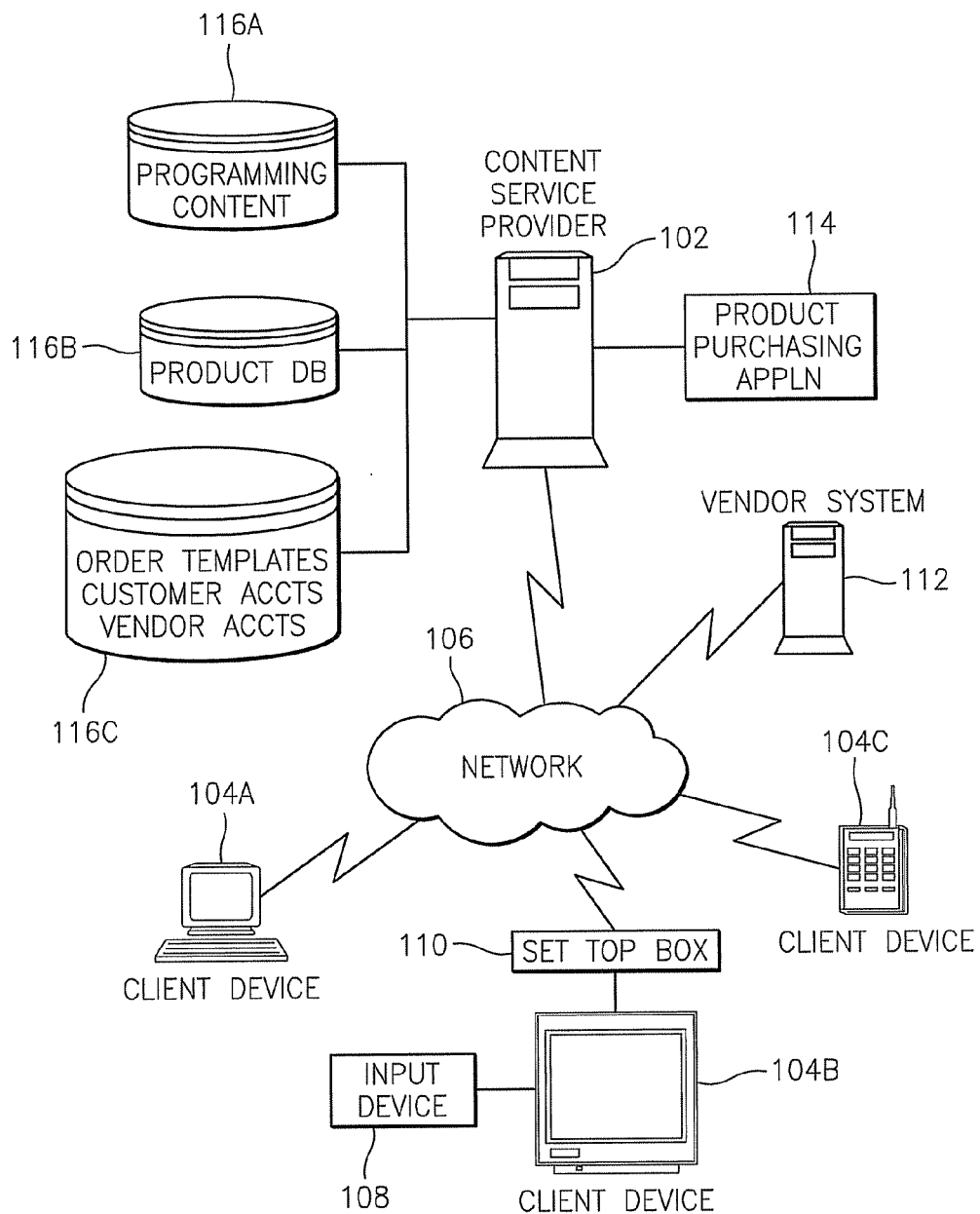
FIG. 1 depicts a block diagram of a system upon which product placement and sales activities may be implemented in exemplary embodiments.

In accordance with exemplary embodiments, techniques for utilizing product placement in programming that provides the ability to immediately acquire a desired product are facilitated via methods, systems, and computer program products for implementing product sales activities as described herein. Turning now to FIG. 1, a system upon which the product placement and sales activities may be implemented in accordance with exemplary embodiments will now be described.

In an embodiment of the present invention, the system of FIG. 1 includes a content service provider system 102 (also referred to herein as "host system") in communication with client devices 104A-104C over a network 106. The host system 102 may be implemented by a content service provider enterprise that provides programming services (e.g., television network programming, cable television programming, video-on-demand programming, premium service programming, etc.). In alternative embodiments, the host system 102 may be implemented by a third party application service provider (ASP) that implements the product sales activities described herein on behalf of entities, such as a content service provider and its customers. In exemplary embodiments, the host system 102 is implemented using one or more servers operating in response to a computer program stored in a storage medium accessible by the server(s). The host system 102 may operate as a network server (e.g., a web server) to communicate with the client devices 104. According to embodiment of the present invention, the host system 102 handles sending and receiving information to and from the client devices 104 and can perform associated tasks. The host system 102 may execute one or more applications (e.g., product purchasing application 114) to provide the product placement and sales activity services described herein.

The host system 102 is in communication with storage devices 116. Storage devices 116 may be implemented using memory contained in the host system 102 or may be separate physical devices. In exemplary embodiments, the storage devices 116 are in direct communication with the host system 102 (via, e.g., wired or wireless technologies). However, other network implementations may be utilized. For example, storage devices 116 may be logically addressable as consolidated data sources across a distributed environment that includes one or more networks 106. Information stored in the storage devices 116 may be retrieved and manipulated via the host system 102. Storage devices 116 store a variety of information for use in implementing the product sales activities. As shown in FIG. 1, storage device 116A stores one or more programs including programming content (e.g., network/cable television programming, video-on-demand programming, premium service programming, etc.). The programming content may be transmitted over network 106, e.g., as streaming media that is processed for transmission and receipt using compression/decompression (codec) technologies. In exemplary embodiments, the transmission is implemented over network 106, which represents an Internet Protocol (IP)-based network.

Storage device 116B may store databases of information relating to products available for purchase that are featured in the programs (e.g., one or more of programs stored in storage device 116A). Storage device 116C may store product order templates, customer account information (e.g., programming viewing accounts), and vendor account information (e.g., vendors whose products are available for sale and are featured in a program) as described farther herein.

Network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A client device 104 may be in communication with the host system 102 through multiple networks (e.g., intranet and Internet) so that not all client devices 104 are coupled to the host system 102 through the same network. One or more of the client devices 104 and the host system 102 may be connected to the network 106 in a wireless fashion.

Each of client devices 104 receives programming content from the host system 102. In exemplary embodiments, each of client devices 104 is Internet-enabled. For example, client device 104A may be implemented using a general-purpose computer (e.g., personal computer, laptop, etc.). Client device 104B may be a television, e.g., IPTV or standard television with a set top box 110 that provides codec functionality and includes, e.g., a Web browser. The client device 104B may include an input device 108 such as, but not limited to, a keyboard, remote control device, or similar item. The client device 104B may be connected to the Internet (e.g., network 106) via a modem, ADSL, cable, PLC, or similar means.

Client device 104C may include a portable device (e.g., MP3 player, 3G cellular telephone, personal digital assistant (PDA), etc.) that receives programming from the host system 102.

While only three client devices 104 are shown in the system diagram of FIG. 1, it will be understood that many client devices 104 may be implemented in order to realize the advantages of the product placement and sales activities described herein.

Also shown in the system of FIG. 1 is a vendor system 112. Vendor system 112 may be implemented by an entity that manufactures, distributes, retails, etc., products available for purchase through the host system 102 and may be used by the host system to provide further information about the products available for purchase, as will be described in further detail below.

As described above, the product placement and sales activities are implemented via the product purchasing application 114. One or more databases are created that provide information relating to various products available for sale and which are featured in the programming content transmitted to viewers, e.g., users of client devices 104. The products may be incorporated into the programming content at the time of program production or origination, or an existing program may be digitally altered post-production to include the products.

Figure 2:
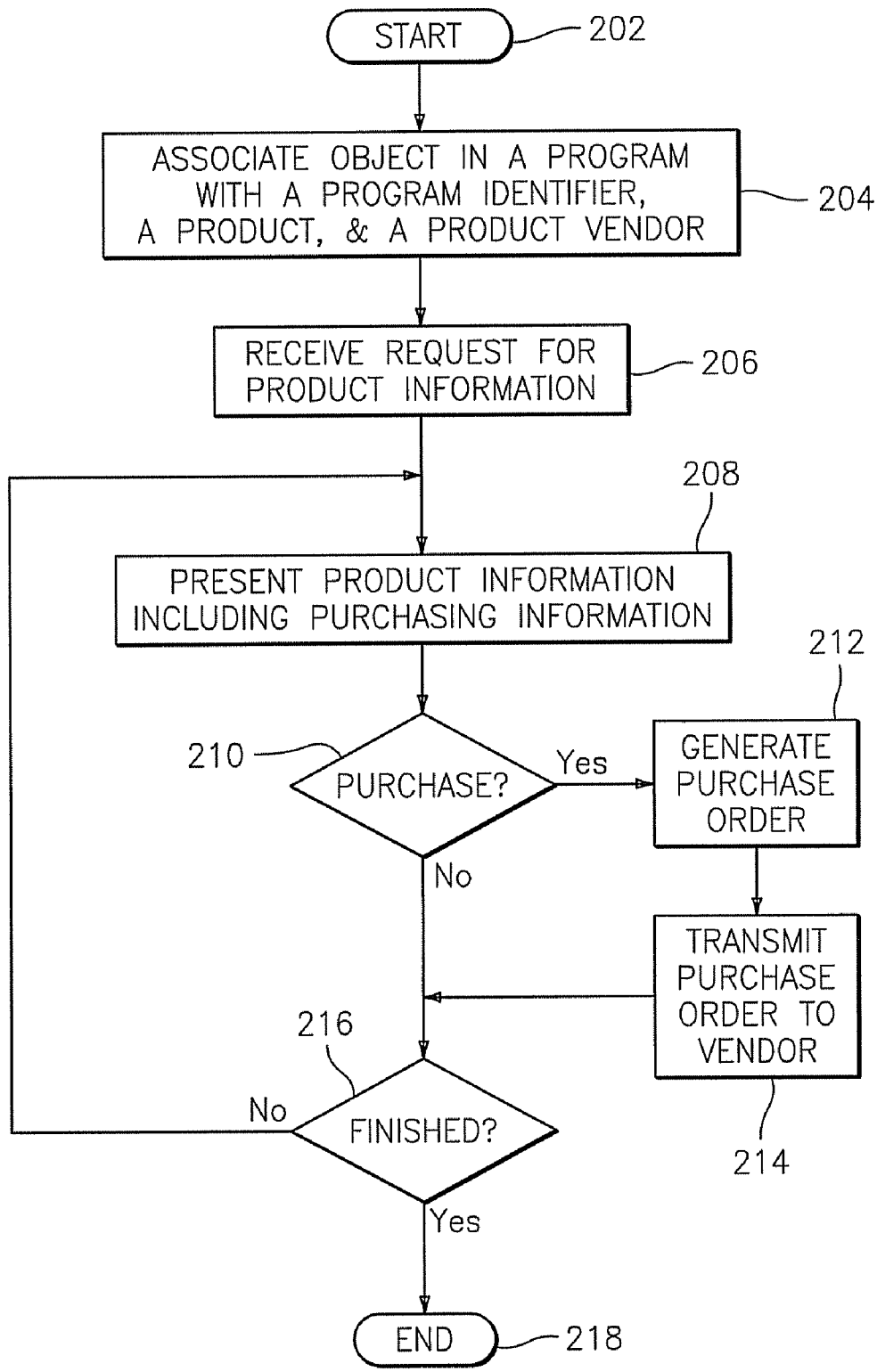
FIG. 2 is a flow diagram describing a process for implementing the product placement and sales activities in exemplary embodiments.

Turning now to FIG. 2, a flow diagram describing a process for implementing the product placement and sales activities will now be described in accordance with exemplary embodiments. The process begins at step 202 whereby an object featured in a program is associated with the program, a product that corresponds to the object, and a product vendor at step 204. This association may be accomplished in various ways. In an exemplary embodiment, the association is implemented by creating a database including program identifiers that each uniquely identify a specific program. Products that are featured in a program via objects (also referred to herein as object images) are identified. For example, a particular program might feature two object images that correspond to products for sale (e.g., an actor is wearing a watch and a pair of sneakers, each of which is shown on the client devices 104 during the program and each of which is available for sale via the product placement and purchasing services). The two products (i.e., watch and sneakers) are identified as products for sale. Each of the products are then mapped to corresponding product identifiers created for each product, and ultimately to the corresponding program identifier for the program in which the product is featured.

It will be understood that the term "object" or "object image" may refer to any form of media, e.g., static or moving (e.g., Flash or video), and may further include text and audio components.

Figure 3:
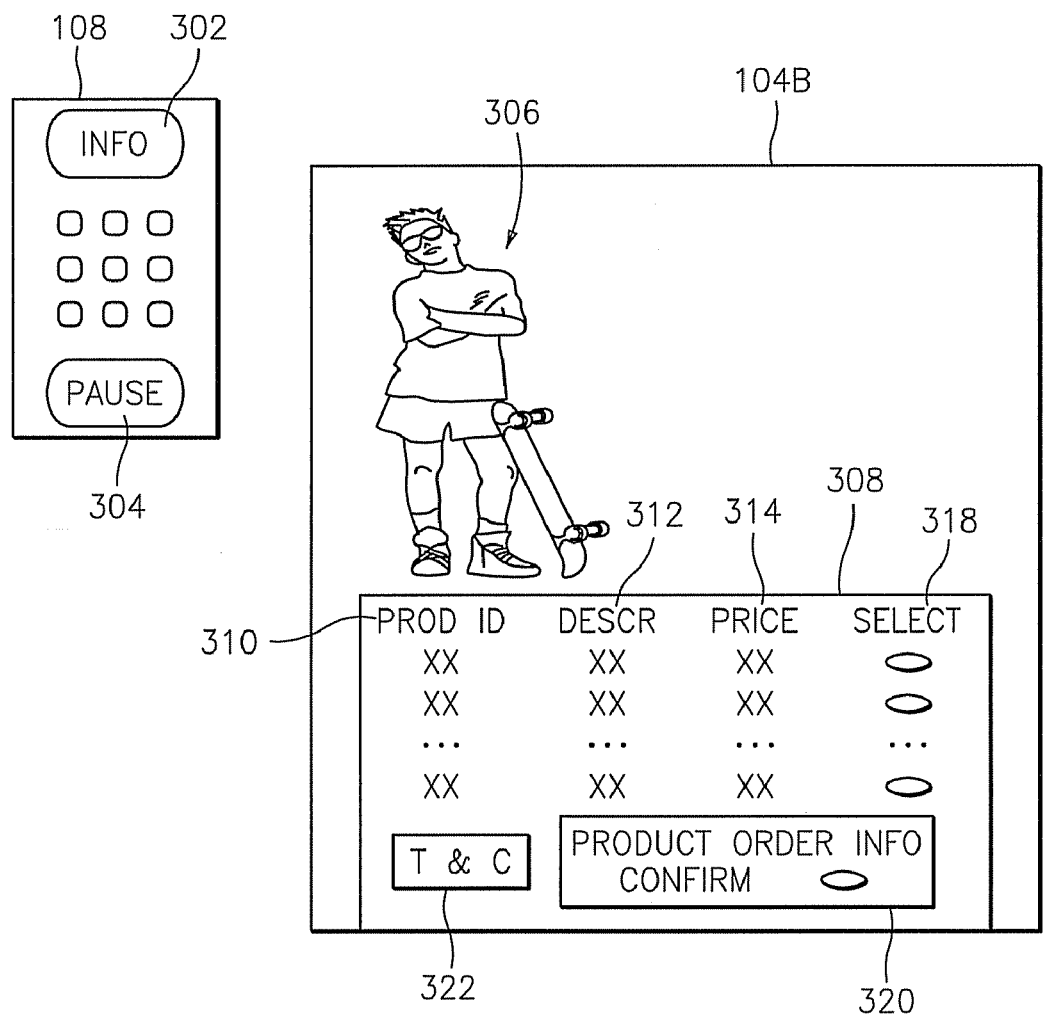
FIG. 3 is a diagram depicting a client device and input component used in implementing the product placement and sales activities in exemplary embodiments.

At step 206, a request for product information is received (e.g., via a query initiated by a user of one of client devices 104). The product information is presented to the user at step 208. Using the embodiment described above in step 204, the product information may be acquired by searching the database for product identifiers mapped to the program identifier with which the object image is associated. The product information that corresponds to the product identifiers and the program identifier is then retrieved from the database. Thus, product information for all products featured in a particular program is presented to the user. For purposes of illustration, a sample program 306 is shown in a window of client device 104B, as illustrated in FIG. 3. The program 306 depicts an actor including object images that correspond to various products for sale. As shown in the window of client device 104B, it is not immediately clear which object images reflect products available for purchase. However, while viewing the program 306, the user may pause the program (via PAUSE button 304) and select an option via input device 108 (e.g., INFO 302) to request product information about products associated with the program. Upon selecting the option 302, a product window 308 is displayed to the user. The product window 308 lists each of the products associated with the program identifier corresponding to the program 306 currently viewed by the user. The program window 308 includes product information presented via fields 310-318. For illustrative purposes, the product information includes product identifiers, product descriptions, product prices, terms and conditions (via option 322) and may also include information such as shipping, taxes, manufacturers of the product, locations where the product is sold, etc. The user may purchase a product of interest by selecting an option in column 318. In further embodiments, product information may include data relating to sponsors, brands, and/or vendors. For example, the product placement and sales activities may provide the ability to call up a list of sponsors associated with a currently playing or future program. The list of sponsors for a program may be invoked from a grid guide, channel browsing mode, search results, DVR recorded programs list, or on-demand list, to name a few. Additionally, the list may include buttons/links to videos, merchandise or other interactive content. For example, a viewer of American Idol may want to see the Ford Focus commercial that contains the Idols contestants or may wish to see the voting call-in numbers. These items may be accessed via an on-screen option, e.g., "SPONSORS" or "SPONSOR FEATURES." Thus, the product placement and sales activities may provide non-purchase related information in addition to product purchasing information. In this embodiment, the object, or object image may be a link to a listing of various sponsors associated with a program and may further provide product/purchasing information.

In exemplary embodiments, a program viewing account of the user may be linked to the product purchase so that the user (purchaser) may be automatically billed by the service provider (e.g., host system 102). In an embodiment of the present invention, the product placement and sales services may also link vendor information (e.g., vendor system 112 address/contact information) to products listed in the database, such that selecting a product for purchase may cause the product purchasing application 114 to invoke the vendor website whereby the user is transferred to the website of the vendor that sells the product. Purchasing activities may be continued or transferred from the host system 102 to the vendor system 112 if desired.

Figure 4:
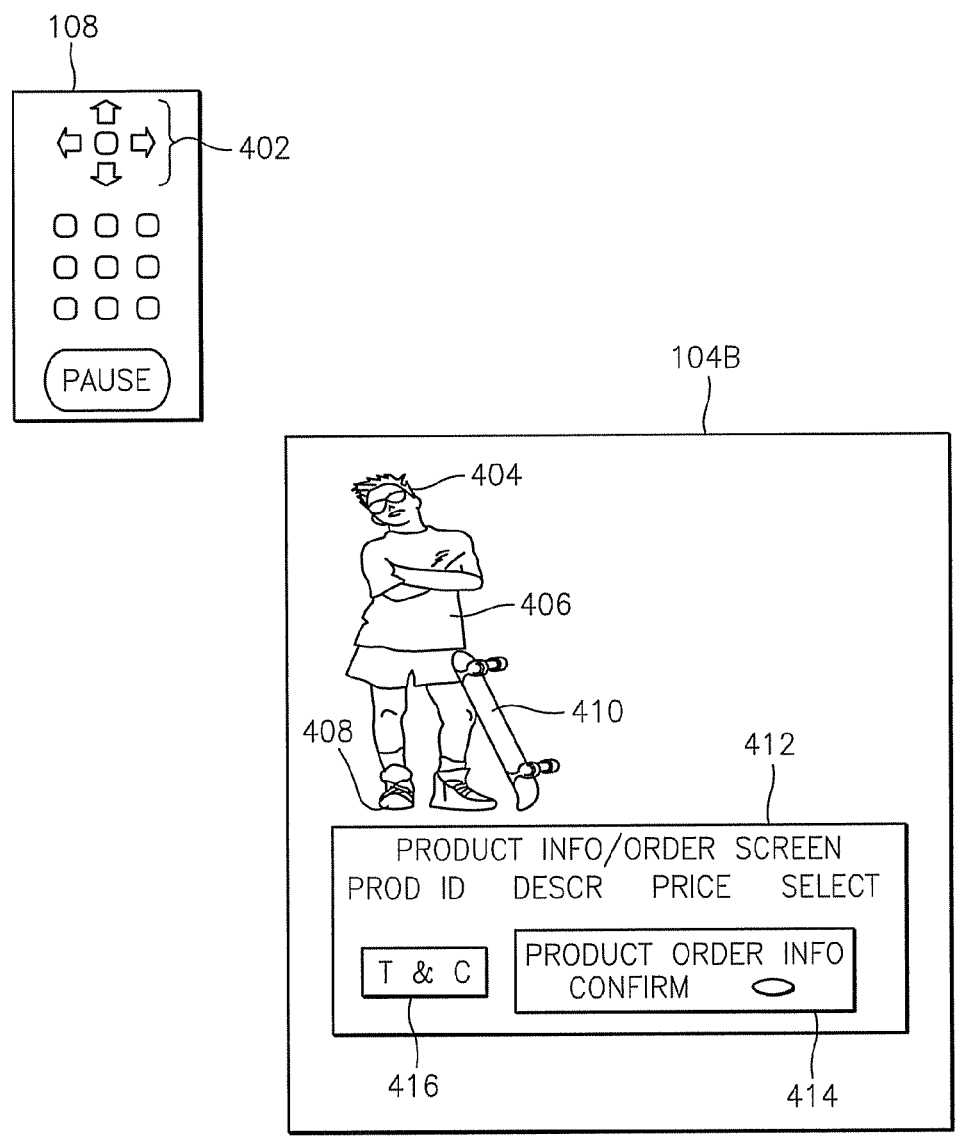
FIG. 4 is a diagram depicting a client device and input component used in implementing the product placement and sales activities in alternative exemplary embodiments.

As indicated above in step 204, an object featured in a program is associated with the program. The association may be accomplished in various ways. In another exemplary embodiment, the association is accomplished by assigning a tag to the object image. The tag links the object image to a product identifier that uniquely identifies the product corresponding to the object image. A database is created that lists products for sale that are featured in one or more programs. Each of the products in the listing is mapped to corresponding product identifiers and product information in the database. The query, or request for product information relating to the object image is implemented by selecting the tag assigned to the object image. For purposes of illustration, a sample program is shown in a window of client device 104B, as illustrated in FIG. 4. The program depicts an actor including object images 404-410, each of which corresponds to a product for sale. As shown in the window of client device 104B, object images representing sunglasses 404, a t-shirt 406, sneakers 408, and a skateboard 410 include tags for products available for purchase. The user may pause the program via the PAUSE button of input device 108 and scroll up, down, left and right through the object images in the program via options 402 on the input device 108. Once an object image is selected, a product window 412 is displayed to the user. The product window 412 provides product information for the selected product, or object image. The user may view the terms and conditions of the purchase via the T&C option 416. If the user selects the product for purchase via the product window SELECT option, a product order information confirmation window 414 is presented. The user may then confirm the purchase via the product order information confirmation window 414.

In yet a further exemplary embodiment, the association may be implemented using a feature recognition component provided by the product purchasing application 114. The feature recognition component includes local feature analysis logic that enables a trace of the object image to be analyzed in order to determine a product of interest by the user. In this embodiment, the client device (e.g., device 104B) executes a trace application (e.g., object doodle program) that enables the user to pause the program as described above, trace the outline and/or features of the object image of interest, and submit the object image trace to the product purchasing application 114. The association may then be implemented by creating a database of object images for products available for purchase, e.g., a database in storage device 116B. Product identifiers that uniquely identify each of the products for purchase are assigned to the object images. The query, or request for product information, may be implemented by receiving the object image trace from the user, scanning the object images in the database for an object image that matches, or is substantially similar to the object image trace. The product information is then presented for products whose object images match or are substantially similar to the object image trace.

Returning to the flow diagram of FIG. 2, a determination is made whether the user has confirmed a purchase of a desired product at step 210. If so, the product purchase application 114 generates a purchase order for the product at step 212 via, e.g., order templates and product purchase information from storage device 116C of FIG. 1. The purchase order may be transmitted to the vendor system 112 for processing. In a further embodiment of the present invention, if a determination is made that the user has confirmed a purchase of a desired product at step 210, the product purchasing application may invoke a vendor website associated with the desired product and continue to handle the purchasing activity of the product or transfer the user to the vendor website for further purchasing activities.

If, however, the purchase is not confirmed by the user at step 210, or alternatively, once the purchase order has been transmitted to the vendor system 112 at step 214, it is determined whether the user is finished (e.g., further product request information received) at step 216. If not, the process returns to step 208. Otherwise, the process ends at step 218.

While the above embodiments describe a process for obtaining product information using a PAUSE feature on a remote control device, it will be understood that alternative means for obtaining this information may be implemented in order to realize the advantages of the invention. For example, an option may be provided for 'clicking' on an item in a moving video using the remote control device or a pointing device.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing sales of products featured in a program, comprising:
   associating an object featured in the program with the program and a product, the product corresponding to the object in the program;
   receiving a request relating to the object featured in the program;
   presenting product information associated with the product corresponding to the object in response to the request relating to the object; and
   generating an order for the product in response to a request to purchase the product;
   wherein associating an object featured in the program with the program includes:
   creating a database of objects for products available for purchase;
   assigning product identifiers, within the database, that uniquely identify the products available for purchase that correspond to the objects;
   pausing the program and tracing an outline or features of an object associated with a product featured in the program to form an object item trace;
   submitting the object item trace to a purchasing application;
   analyzing the submitted object item trace by the purchasing application utilizing a feature recognition component;
   scanning the objects available for purchase in the database for an object that matches or is similar to the object item trace; and
   presenting the product information for the product corresponding to the object that matches or is similar to the object item trace.

2. The method of claim 1, wherein the product information is presented during viewing time of the program, the product information including at least one of:
   a product description;
   product price;
   terms and conditions of purchase; and
   shipping information.

3. The method of claim 1, wherein the order generated is linked to a program viewing service account of a purchaser of the product, the method further comprising billing the purchaser via the program viewing service account.

4. The method of claim 1, further comprising:
   associating the product with information about a vendor of the product, wherein presenting product information includes invoking a website of the vendor of the product.

5. A system for implementing sales of products featured in a program, comprising:
   a host system;
   a product purchasing application executing on the host system, the product purchasing application implementing a method, comprising:
   associating an object featured in the program with the program and a product, the product corresponding to the object in the program;
   receiving a request relating to the object featured in the program;
   presenting product information associated with the product corresponding to the object in response to the request relating to the object; and
   generating an order for the product in response to a request to purchase the product;
   wherein associating an object featured in the program with the program includes:
   creating a database of objects for products available for purchase;
   assigning product identifiers, within the database, that uniquely identify the products available for purchase that correspond to the objects;
   pausing the program and tracing an outline or features of an object associated with a product featured in the program to form an object item trace;
   analyzing the object item trace utilizing a feature recognition component;
   scanning the objects available for purchase in the database for an object that matches or is similar to the object item trace; and
   presenting the product information for the product corresponding to the object that matches or is similar to the object item trace.

6. The system of claim 5, wherein the product information is presented during viewing time of the program, the product information including at least one of:
   a product description;
   product price;
   terms and conditions of purchase; and
   shipping information.

7. The system of claim 5, wherein the order generated is linked to a program viewing service account of a purchaser of the product, the method further comprising billing the purchaser via the program viewing service account;
   wherein the method further comprises associating the product with information about a vendor of the product, wherein presenting product information includes invoking a website of the vendor of the product.

8. A non-transitory computer-readable storage medium for implementing sales of products featured in a program, the computer-readable storage medium storing instructions for implementing a method, the method comprising:
   associating an object featured in the program with the program and a product, the product corresponding to the object in the program;
   receiving a request relating to the object featured in the program;
   presenting product information associated with the product corresponding to the object in response to the request relating to the object; and
   generating an order for the product in response to a request to purchase the product;
   wherein associating an object featured in the program with the program includes:
   creating a database of objects for products available for purchase;
   assigning product identifiers, within the database, that uniquely identify the products available for purchase that correspond to the objects;
   pausing the program and tracing an outline or features of an object associated with a product featured in the program to form an object item trace;
   analyzing the object item trace utilizing a feature recognition component;
   scanning the objects available for purchase in the database for an object that matches or is similar to the object item trace; and
   presenting the product information for the product corresponding to the object that matches or is similar to the object item trace.

9. The computer program product of claim 8, wherein the product information is presented during viewing time of the program, the product information including at least one of:
   a product description;
   product price;
   terms and conditions of purchase; and
   shipping information.

10. The computer program product of claim 8, wherein the order generated is linked to a program viewing service account of a purchaser of the product, the method further comprising billing the purchaser via the program viewing service account.

11. The computer program product of claim 8, further comprising instructions for implementing:
   associating the product with information about a vendor of the product, wherein presenting product information includes invoking a website of the vendor of the product.

* * * * *